3,321,505
THERMALLY STABLE SILICATE ESTERS
Marvin M. Fein, Westfield, Nelson N. Schwartz, Trenton, and Sidney I. Karlan, Nutley, N.J., assignors to Thiokol Chemical Corporation, Bristol, Pa., a corporation of Delaware
No Drawing. Filed Nov. 13, 1963, Ser. No. 324,170
25 Claims. (Cl. 260—448.8)

This invention relates to a novel class of silicates. More particularly, this invention relates to the preparation of the silicates of hydroxy terminated carboranes such as the mono and bis hydroxyalkyl carboranes and their derivatives.

The novel carboranyl silicates of this invention are composed of three distinct and related esters designated I, II and III below.

(I) 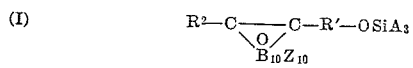

(II) 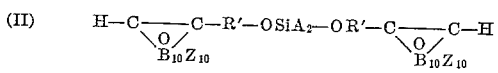

(III) 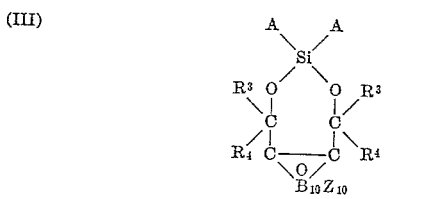

wherein R' is an alkylene radical preferably of less than 6 carbon atoms, $R^3$ and $R^4$ which can be the same or different are members selected from the group consisting of hydrogen and methyl, A which can be the same or different at any given time is selected from the group consisting of alkyl, aryl and arylalkyl, Z is a member selected from the group consisting of hydrogen, halogen, alkyl and aryl, and $R^2$ is selected from the group consisting of hydrogen and —R'—OSiA$_3$ in which R' and A have the same meaning ascribed to them above.

The symbol

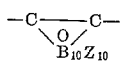

alternatively referred to as $\theta$ (theta) represents the carborane group in which one or more of the boronic hydrogens normally in the carborane group can be replaced with halogen(s), aryl or alkyl. The limitation being that the sum of the hydrogens, if any, with the other atoms or radicals shall not exceed ten (10).

Within recent years there has been an accelerated use of high temperature processes and devices. This in turn has stimulated an interest in the preparation of thermally stable liquids, particularly those combining thermal stability with chemical inertness and high density. Chemically inert, thermally stable liquids are potentially valuable for a number of applications. These include uses as hydraulic fluids, heat transfer media, instrument lubricants as well as flotation liquids in compasses, gyroscopes and other instruments of this type. Where the above characteristics of heat stability and inertness is coupled with a relatively high density, these liquids can be used as flotation or separation liquids in mining operations. Unfortunately liquids having this especially desirable combination of good heat stability, chemical inertness and relatively high density are rare and cannot readily be made in commercial quantities.

Thus it is an object of this invention among others to provide a novel class of thermally stable, chemically inert liquids which are useful as heat transfer fluids.

It is a further object of this invention to prepare flotation liquids useful in the mining and chemical processes industries.

Yet a further object of this invention is the preparation of novel silicon containing polymers and polymer intermediates.

Still another object is the preparation of cyclic monomers of organically bound silicon and boron.

Further objects will become apparent to the reader after a further reading of this patent application.

In practice a halo or alkoxysilane reactant is contacted with a carboranyl alcohol in approximately stoichiometric quantities under esterifying conditions, i.e., heat and anhydrous conditions until a substantial quantity of the mono- or di-ester is formed. The reaction course can be followed in most instances by the evolution of the hydrogen halide produced as a by-product during the reaction. When the evolution of halide has substantially ceased the esterification can be halted. The ester products can be conveniently isolated and purified by a number of well known purification methods such as, distillation, solvent extraction, chromatography and the like. In the instance of the monomeric compounds designated III many of the compounds can be purified by sublimation.

One group of silane esters of this invention can be prepared by the esterifying process shown below:

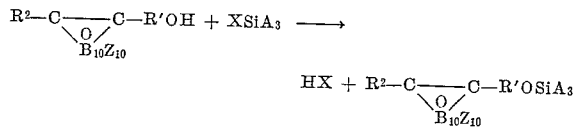

wherein A is a member selected from the group consisting of alkyl aryl and alkylaryl, X is a member selected from the group consisting of halogen (fluorine, chlorine and bromine), and alkoxy group having from 1–6 carbon atoms, R' is an alkylene radical, Z is selected from the group consisting of hydrogen, halogen, alkyl and aryl radicals, and $R^2$ is selected from the group consisting of hydrogen and —R'—OSiA$_3$ in which R' and A have the same meaning ascribed to them above.

A typical embodiment of the afore-described reaction between a trialkylhalosilane (or a trialkylalkoxysilane) is the preparation of the 1,2-bis(triethylsiloxymethyl)decachlorocarborane. The ester is made by refluxing a reaction mixture consisting of 55 parts by weight of 1,2-bis-(hydroxymethyl)decachlorocarborane, 35 parts by weight of triethylchlorosilane and 300 parts by weight toluene for 24 hours. Distillation under high vacuum gives rise to an oil B.P. 325° C./0.01 mm. which can be shown by infra-red and elemental analysis to be the desired ester.

A second embodiment of this phase of the invention is the preparation of 1,2-bis(triethylsiloxypropyl)carborane. This ester is prepared by refluxing a reaction mixture of 26 parts by weight of 1,2-bis(hydroxypropyl)carborane, 40 parts by weight of triethylethoxy silane and 180 parts by weight of toluene for 24 hours. The ester product has a B.P. 200° C./mm.

Another embodiment of the above reaction is the preparation of the 1,2-bis(triethylsiloxymethyl)B-phenylcarborane. This ester is prepared by refluxing a reaction mixture consisting of 14 parts by weight of 1,2-bis(hydroxymethyl)B-phenylcarborane, 20 parts by weight of triethylchlorosilane and 75 parts by weight of toluene for 24 hours. Distillation under high vacuum gives rise to an oil B.P. 200° C./1.5 mm., which can be shown by infra-red and elemental analysis to be the desired ester.

Yet another embodiment of the afore-described reaction is the preparation of 1,2-bis(triethylsiloxymethyl)B-ethylcarborane. This ester is prepared by refluxing a reaction mixture consisting of 23 parts by weight of 1,2-bis-(hydroxymethyl)B-ethylcarborane, 40 parts by weight of triethylchlorosilane and 150 parts by weight of toluene for 12 hours. The product an oil, B.P. 180° C./1 mm. is separated from reaction by-products by distillation under high vacuum. The identity of the oil as the desired ester product can be established by infra-red and elemental analysis.

Still another embodiment is shown by the preparation of 1,2-bis(trimethylsiloxymethyl)carborane.

In this preparation a reaction mixture consisting of 103 parts by weight of 1,2-bis(hydroxymethyl)carborane, 100 parts by weight of trimethylchlorosilane and 120 parts by weight of toluene are refluxed for 36 hours. At the end of this time the excess solvent and the by-products are distilled off under high vacuum leaving a colorless oil B.P. 140–146° C./0.5 mm. Infra-red and elemental analysis confirm that the desired ester is produced.

In an analogous embodiment 1,2-bis(tri-n-propylsiloxymethyl)carborane ester is prepared. In this preparation a reaction mixture comprising 20 parts by weight of 1,2-bis(hydroxymethyl)carborane, 25 parts by weight of tri-n-propylchlorosilane and 30 parts by weight of toluene are refluxed for 32 hours. At the end of this time, the ester product is separated from solvent and by-products by vacuum distillation. A colorless oil of B.P. 190–195° C./0.5 mm. is produced and its identity is confirmed by infra-red and elemental analysis.

The above illustrative embodiments of this invention concern the bis esters of 1,2-carboranyl alcohols. However comparable mono-esters can be prepared using 1-hydroxyalkylcarborane reactants as the carboranyl alcohols and the same or similar trialkyl silane reactants. For example the 1-tripropylsiloxymethyl carborane can be prepared as follows: a reaction mixture of 174 parts by weight 1-hydroxymethylcarborane, 200 parts by weight of tripropylchlorosilane and 500 parts by weight of toluene are refluxed for 24 hours at which time esterification has substantially taken place. The ester product is an oil B.P. 150–155° C./1 mm. separated and identified as described previously.

Another embodiment using the 1-hydroxyalkylcarborane is the preparation of 1-triethylsiloxyethylpentachlorocarborane. In this preparation a reaction mixture consisting of 25 parts by weight of 1-hydroxyethylpentachlorocarborane, 18 parts by weight of triethylchlorosilane and 40 parts by weight of toluene are refluxed for 36 hours. The reaction mixture was stripped and the viscous oily residue identified as before.

Similarly 1-trimethylsiloxymethyl-carborane is prepared by refluxing a reaction mixture of 75 parts by weight of 1-hydroxymethylcarborane, 100 parts by weight of trimethylethoxysilane and 50 parts by weight of benzene, for 38 hours. The ethyl alcohol and benzene are stripped off and a colorless oily product is obtained. The identity of the ester is confirmed by elemental and infra-red analysis.

Using comparable preparation, separation and analytical techniques the 1-triethylsiloxypropyl decachloro carborane is prepared by refluxing a reaction mixture of 75 parts by weight 1-hydroxypropyl decachloro carborane, 110 parts by weight of triethylmethoxysilane and 35 parts by weight of toluene for 72 hours. Again the product is separated by vacuum stripping and can be identified by infra-red and elemental analysis.

Other illustrative examples of the many trialkylsiloxyalkylcarborane esters which can be prepared using the above-described process variants include among others bis-esters such as:

1,2-bis(trimethylsiloxymethyl)carborane,
1,2-bis(trimethylsiloxymethyl)-B-methylcarborane,
1,2-bis(trimethylsiloxymethyl)decachlorocarborane,
1,2-bis(methyldiethylsiloxymethyl)carborane,
1,2-bis(methylethylpropylsiloxyethyl)pentachlorocarborane,
1,2-bis(methylethylpropylsiloxyethyl)-B-propylcarborane,
1,2-bis(tri-n-propylsiloxymethyl)carborane,
1,2-bis(tri-n-isopropylsiloxymethyl)carborane,
1,2-bis(tri-n-butylsiloxymethyl)carborane,
1,2-bis(tri-n-pentylsiloxymethyl)carborane,
1,2-bis(triisopentylsiloxymethyl)carborane,
1,2-bis(tricyclohexylsiloxymethyl)carborane,
1,2-bis(tri-n-hexylsiloxymethyl)carborane,
1,2-bis(triphenylsiloxymethyl)carborane,
1,2-bis(trimethylsiloxyethyl)carborane,
1,2-bis(trimethylsiloxy-n-propyl)carborane,
1,2-bis(trimethylsiloxy-n-butyl)carborane: among the mono-1 esters are included:

1-trimethylsiloxymethylcarborane,
1-trimethylsiloxymethyl-B-methylcarborane,
1-trimethylsiloxymethyl-decachlorocarborane,
1-triethylsiloxymethylcarborane,
1-triethylsiloxymethylpentachlorocarborane,
1-tri-n-butylsiloxymethylcarborane,
1-trimethylsiloxyethylcarborane,
1-trimethylsiloxy-n-propylcarborane,
1-trimethylsiloxy-n-butylcarborane,
1-trimethylsiloxy-n-pentylcarborane,
1-trimethylsiloxycyclocarborane.

As indicated supra a related but somewhat dissimilar aspect of this invention is the preparation of a second class of silane esters, the dialkyl-bis(1-carboranylalkoxy) silanes. These compounds are formed from the reaction of a dihalo or dialkoxy dialkylsilane reactant with a 1-hydroxyalkylcarboranyl alcohol. Again the reaction is conducted under esterifying conditions of heat and anhydrous conditions preferably in the presence of one or more inert aliphatic or aromatic solvents such as hexane or toluene. Where an inert solvent such as toluene is utilized the reaction is refluxed at the boiling point of the reaction mixture for a period ordinarily ranging from 12–48 hours although individual reactants may require more or less time. When the reaction is substantially complete the by-products are ordinarily removed by distillation under vacuum although other conventional separation methods such as extraction or chromatography can be utilized.

The reaction shown below typifies the preparations:

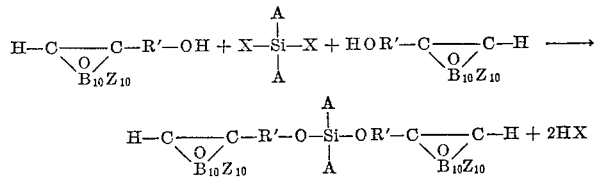

wherein X is selected from the group consisting of acetoxy, chlorine, bromine and fluorine, R' is an alkylene radical A which can be the same or different at any given time, is selected from the group consisting of alkyl, aryl, arylalkyl and Z is selected from the group consisting of hydrogen, halogen, aryl and alkyl, with the limitation that the sum of the hydrogen, alkyl, aryl and halogen atoms shall not exceed ten (10).

An embodiment of the above described process variant is the preparation of diethyl-bis(1-carboranylmethoxy) silane. This ester is prepared by refluxing a reaction mixture of 174 parts by weight 1-hydroxymethylcarborane, 170 parts by weight of diethyldichlorosilane and 800 parts by weight of toluene for 60 hours. The reaction mixture is distilled under vacuum to remove all but the ester product which was an oil B.P. 250° C./0.0 mm. Infra-red analysis and elemental analysis established that the desired ester was produced.

Another embodiment of the second process is the preparation of dibutyl-bis(1-pentachlorocarboranyl methoxy) silane. This ester is prepared by refluxing a reaction mixture of 32 parts by weight of 1-hydroxymethylpentachlorocarborane, 45 parts by weight of dibutyl-dichlorosilane and 125 parts by weight of toluene for 36 hours. At the end of this time the by-products and solvents are distilled off leaving an oily material. Again infra-red and elemental analyses are used as an indicia of identity.

In yet another embodiment of the above process dimethyl-bis(1-decachlorocarboranyl ethoxy) silane is prepared. The preperation involves refluxing a reaction mixture of 27 parts by weight of 1-hydroxyethyldecachloroborane, 10 parts by weight of dimethyldichlorosilane and 50 parts by weight of toluene. After stripping off solvents and by-products the ester product having a B.P. 300° C. at 0.01 mm. is obtained. Infra-red and elemental analysis confirms the esters identity.

Still another embodiment is shown by the preparation of dimethyl-bis-(1-carboranylmethoxy)silane. This preparation is obtained by refluxing a reaction mixture of 129 parts by weight of dimethyldichlorosilane, 440 parts by weight of benzene and 21.6 parts by weight of 1-hydroxymethylcarborane, for a period of 35 hours. At the end of this time all the components of the mixture but the product are stripped off at 120° C./15 mm. leaving an oily residue of product. Again infra-red and elemental analysis is used to check on the ester formation.

Further embodiments are as follows: Dimethyl-bis(1-B-phenylcarboranylmethoxy)silane is prepared by refluxing 50 parts by weight of 1-hydroxymethyl-B-phenylcarborane with 15 parts by weight of dimethyldichlorosilane and 100 parts by weight of toluene for 24 hours. The ester had a B.P. of 250–280° C./0.1 mm. Identity was established as before.

Dimethyl-bis(1-B-ethyl-carboranylmethoxy) silane is prepared by refluxing 20 parts by weight of 1-hydroxymethyl-B-ethylcarborane, 10 parts by weight of dimethyldibromo-silane and 25 parts by weight of toluene for 48 hours after stripping off solvent and by-products an ester having a B.P. of 210–212° C./0.1 mm. is obtained.

Elemental and infra-red analysis establishes the identity of the product.

Dimethyl-bis(1-B-ethylcarboranylmethoxy)silane is prepared as above except that dimethyldiacetoxysilane (8 parts by weight) is substituted for the dimethyldibromosilane reactant. The ester product is the same in both instances.

Further illustrative examples of the second group of dialkyl-bis(1-carboranylalkoxy)silanes which can be prepared as above include among others:

dimethyl-bis(1-carboranylmethoxy)silane,
dimethyl-bis(1-carboranylethoxy)silane,
dipropyl-bis(1-carboranylmethoxy)silane,
diethyl-bis(1-pentachloroboranylmethoxy)silane,
diethyl-bis(1-pentachlorocarboranylmethoxy)silane,
diethyl-bis(1-decachlorocarboranylethoxy)silane,
diethyl-bis(1-B-n-propylcarboranylethoxy)silane and the like.

The third class of silane esters which can be prepared by the esterification process of this invention are the cyclic monomers referred to supra as Compound III. These compounds are prepared by reacting 1,2-bis(hydroxymethyl)carborane and a dialkyldihalo (or diacetoxy) silane preferably in the presence of inert solvents in approximately a mole to mole ratio at elevated temperatures under anhydrous conditions typical of esterfication procedures used to form silicate esters. The products can be purified by a number of methods including sublimation after stripping off by-products and solvents under vacuum. The main course of esterification is believed to be:

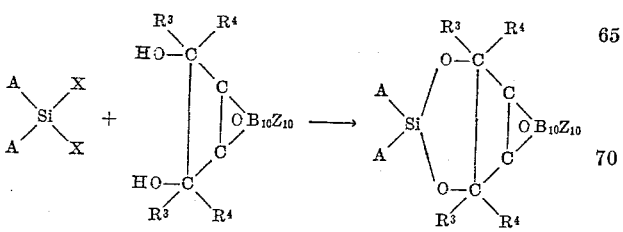

wherein X is selected from the group consisting of alkoxy, chlorine, bromine and fluorine, R' and R² which can be the same or different are selected from the group consisting of hydrogen and methyl, A, which can be the same or different is selected from the group consisting of alkyl, aryl and arylalkyl and Z is selected from the group consisting of hydrogen, halogen, alkyl and aryl with the limitation that the sum of the substituents, be they hydrogen, alkyl, aryl or halogen atoms, shall not exceed 10 (ten).

An embodiment of the above described process is in the preparation of the cyclic dimethyl silicate of 1,2-bis(hydroxymethyl)carborane. The ester is prepared as follows:

A reaction mixture of 46 parts by weight of 1,2-bis(hydroxymethyl)carborane, 45 parts by weight of dimethyldibromosilane and 150 parts by weight of toluene are refluxed 72 hours to produce a crude ester which infrared analysis elemental analysis and molecular weight determinations indicated were the desired cyclic monomer having the structure:

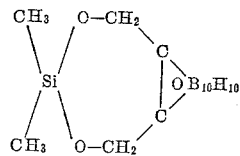

A further embodiment is the preparation of the analogous:

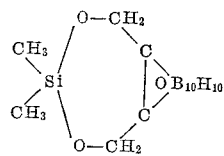

In this preparation a reaction mixture of 10.3 parts by weight of 1,2-bis(hydroxymethyl)carborane, 6.4 parts by weight of dimethyl-dichloro-silane and 4.5 parts by weight of toluene are refluxed for 72 hours to produce the above esters. After concentration under vacuum the crude product is purified by sublimation at 100° C./0.02 mm. The purified product melted at 98–100° C. and is shown by elemental analysis infra-red analysis and molecular weight determination to have the above structure.

Yet a further embodiment of the cyclic dialkylsilane esters involves the preparation of the structure:

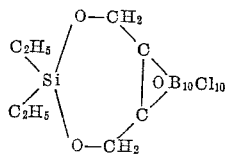

In this preparation a reaction mixture of 55 parts by weight of 1,2-bis(hydroxymethyl)decachlorocarborane, 18 parts by weight of diethyldichlorosilane and 125 parts by weight of toluene are refluxed for 72 hours to produce the ester. The by-products and solvent are stripped off and the ester purified by sublimation. Infra-red and elemental analysis as well as molecular weight determinations confirm that the desired ester is produced.

Still another embodiment of the cyclic dialkylsilane esters involves the preparation of the structure:

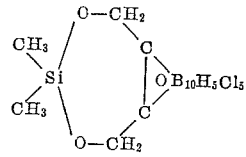

In this preparation a reaction mixture of 36 parts by weight of 1,2-bis(hydroxymethyl)pentachlorocarborane, 15 parts by weight of dimethyldichlorosilane and 75 parts by weight are refluxed for 72 hours to produce the ester. Concentration, purification and confirmation of structure are as described previously.

The novel products of this invention can be prepared using various modifications of the described esterification reaction without substantially deviating from the inventive concept. For example, the order of adding the reactants is unimportant and reaction conditions such as temperature and pressure need not be rigidly controlled. For instance, the temperature range of which esterification takes place can range between 0° and 150° C. Since the lower temperature appreciably extends reaction time and the upper temperature range introduces competing side reactions, the process is commonly run between about 50 to 120° C. This narrower temperature range not only gives optimum yields but it coincides with the refluxing temperature of some of the favored inert reaction solvents such as toluene and benzene. For these reasons this temperature range is preferred. Smaller batches of product can be prepared conveniently using a steam bath as the heating source. Again while the esterification can be operated under a wide range of pressure conditions ranging from sub- through superatmospheric pressures, no advantage arises in using pressures substantially below or above atmospheric pressure. For this reason, near atmospheric pressures are preferred. Since the reaction time is dependent upon a number of reaction condition variables, including reaction temperature and the reactants used, it cannot be given with precision. However, generally a range of reaction time of 24 hours–96 hours or even longer is the rule rather than the exception.

As indicated earlier, the trialkylsiloxy alkyl group can be contributed by a variety of sources. Preferably the trialkylhalosilanes and the dialkyldihalosilanes are used as the esterifying reactants. They are preferred because they are commercially available inexpensive reactants which rapidly form silicate esters with the co-reactants of this invention. Alternative sources of the tri- and di-alkylsiloxy radicals are trialkylethoxysilane and dialkyldiethoxysilane respectively.

The preferred trialkylsiloxy reactants, the trialkylhalosilane and the dialkyldihalosilanes are commercially available products or can be prepared by well known methods described in the patent and technical literature. The alternative reactants are also commercially available compounds.

The 1,2-bis(hydroxyalkyl)carborane reactants of this invention can be prepared by the interaction of a diacetate derivative of an α,ω-acetylenic diol and 6,9-bis(acetonitrilo)decaborane to yield the 1,2-bis(acetoxyalkyl)carborane. This intermediate is then transesterified with methanolic hydrogen halides to yield the 1,2-bis(hydroxyalkyl)carborane. For example, the lowest member of the series, 1,2-bis(hydroxymethyl)carborane, is prepared by reacting 1,4-diacetoxy-2-butyne with 6,9-bis(acetonitrile)decaborane until the 1,2-bis(acetoxymethyl)carborane is prepared in substantial amount and then transesterifying in methanolic HCl to the 1,2-bis(hydroxymethyl)carborane.

The 1-hydroxyalkylcarborane reactants are prepared similarly by contacting propargyl acetate with 6,9-bis(acetonitrile)decaborane, or decaborane in the presence of a Lewis base, to yield the 1-(acetoxyalkyl)carborane and transesterifying in methanolic hydrogen halide to form the 1-hydroxyalkylcarborane.

For example, the lowest member of the series, the 1-hydroxymethylcarborane can be prepared as follows:

A reaction mixture of 98 parts by weight of propargyl acetate, 122 parts by weight of decaborane, 41 parts by weight of acetonitrile and 270 parts by weight of toluene are refluxed for 24 hours. The reaction mixture is cooled and filtered and the filtrate refluxed for 18 hours with 160 parts by methanol to convert the non-carborane constituents of the mixture to methyl borate. The reaction mixture is distilled at 90° C. at 15 mm. to strip off methyl borate and excess methanol. The distillation residue is extracted with 500 parts by weight of boiling n-hexane to extract the 1-acetoxymethylcarborane. The extract is chilled to −20° C. to precipitate crystals (185 parts by weight) of 1-acetoxymethylcarborane. The 1-acetoxymethylcarborane is converted to 1-hydroxymethylcarborane by dissolving it and it with refluxing methanolic hydrogen chloride. The refluxing is halted after 4 hours and the methyl acetate by-product removed by azeotropic distillation. The residue of 1-hydroxymethylcarborane is recrystallized from toluene and yields about 140 parts by weight of crystalline product.

The higher 1-hydroxyalkylcarborane can be prepared by the same general process except that longer chain acetylenic reactants are reacted with decaborane in the presence of a Lewis base such as acetonitrile.

For example, 1-hydroxyethylcarborane is prepared by refluxing stoichiometric quantities of decaborane and 1-butyne-4-yl acetate in excess acetonitrile and separating the by-products and transesterifying, distilling and purifying as before.

Similarly 1-hydroxypropylcarborane is prepared by refluxing stoichiometric quantities of decaborane and 1-pentyn-5-yl acetate in excess acetonitrile. Again the preliminary separations, transesterification distillations and purification is as described earlier.

In those cases where the 1-hydroxyalkyl and 1,2-bis(hydroxyalkyl) substituted carboranes such as 1-hydroxydecachlorocarborane or 1,2-bis(hydroxymethyl)-B-phenyl carborane are utilized as reactants the basic chemistry is the same. However in these instances the substitution of one or more alkyl, aryl or halogens for the one or more of the boronic hydrogens of the carborane group is done prior to the preparation of the hydroxyalkyl moiety.

A description of the preparation of those compounds in which one or more alkyl, aryl or halogens are substituted for one or more of the boronic hydrogens appears in Inorg. Chem., vol. 2, No. 6 (Dec. 2, 1963).

The quantities of the two reactants used in the esterification will, of course, be dependent upon which product is being prepared; for example, whether the mono ester or the bis (di) ester is being prepared. In the case of the former product at least a 1:1 mole ratio of the two reactants is desirable with a larger excess of the silane not being harmful. However, a large excess of the hydroxyl containing reactant is to be avoided since yields are diminished. Similarly, where the bis esters are to be prepared since there are sources of hydroxyl groups available, at least two moles of the trialkylsiloxyalkyl reactant is desirable preferably with a large excess of this reactant being preferred. Obviously anything less than two moles of the silane reactant will both reduce yields and give a mixture of both mono and di-ester.

The di- and trialkylsiloxy esters of this invention are advantageous in a number of respects. For example, all of the esters of this invention possess the unusual combination of thermal stability, chemical inertness which gives them utility as heat transfer fluids, high pressure lubricants flotation liquids and the like. In addition, some of these esters can be cyclized and/or polymerized to yield useful and inert thermally stable polymers. However, as in any large group of compounds, some members within the group are preferred for some reasons to the group as a whole. In the case of the products of this invention, the compounds (I, II or III) having alkylene radicals (R') of 6 or less carbon atoms are favored since they are less costly and tedious to prepare and the intermediates for their preparation are more readily available. Similarly within this narrower and more favored group of compounds having alkylene radicals (R') of 6 or less carbons, the preferred products whether mono or bis, are the compounds wherein all ten (10) of the boronic hydrogens are intact and unsubstituted and A is an alkyl radical of 6 or less carbon atoms. The reason for preferring these compounds over the broad group as a whole the narrower group of favored compounds are several. For example, for high temperature applications such as heat transfer and brake fluids, compounds having no substituents for the boronic hydrogens (Z) are less likely to break down and give off corrosive degradation products. For instance, the products in which halogens have been substituted for the boronic hydrogens are more likely to break down to form corrosive by-products than the aforementioned products. Other reasons for this preference are cost, ease of preparation and again more readily available intermediates.

While several uses and advantages of the ester products of this invention have been disclosed, others will become apparent to the reader after further reading of this application.

It is to be clearly pointed out that the foregoing embodiments and examples are illustrative only and do not constitute the metes and bounds of this invention. Numerous changes in reactants and reaction conditions can be made without departing from the inventive concept.

We claim:

1. Silane esters of carboranyl alcohols selected from the group consisting of:

(I) 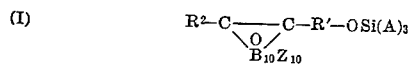

(II) 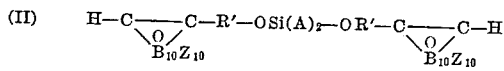

(III) 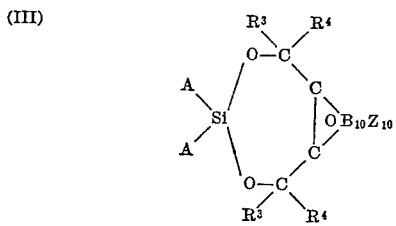

wherein R' is an alkylene radical, R³ and R⁴ are members selected from the group consisting of hydrogen and methyl, A is selected from the group consisting of alkyl, aryl and arylalkyl, Z is a member selected from the group consisting of hydrogen, halogen, alkyl and aryl, and R² is selected from the group consisting of hydrogen and —R'—OSiA₃ in which R' and A have the same meaning ascribed to them above.

2. 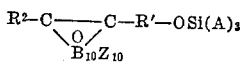

wherein R' is an alkylene radical, A is selected from the group consisting of alkyl, aryl and arylalkyl, Z is selected from the group consisting of hydrogen, halogen, alkyl and aryl, and R² is selected from the group consisting of hydrogen and —R'—OSiA₃ in which R' and A have the same meaning ascribed to them above.

3. 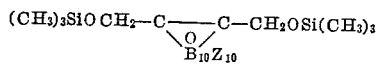

wherein Z is selected from the group consisting of hydrogen, alkyl and aryl.

4. 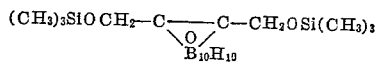

5. 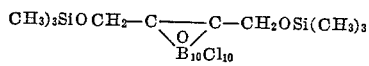

6. 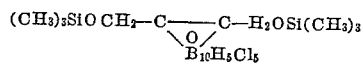

7. 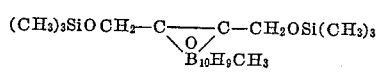

8. 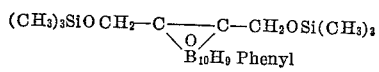

9. 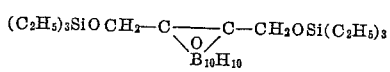

10. 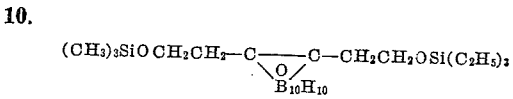

11. 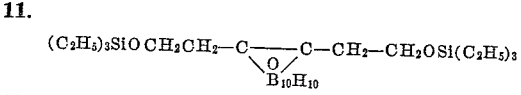

12. 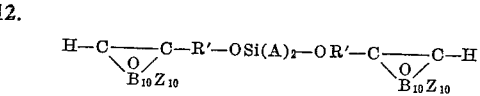

wherein R' is an alkylene radical, A is selected from the group consisting of alkyl, aryl and arylalkyl and Z is selected from the group consisting of hydrogen, halogen, alkyl and aryl.

13. 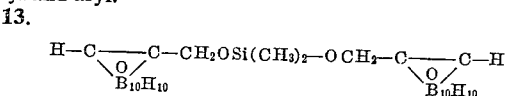

14. 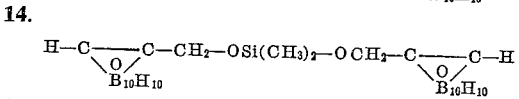

15. 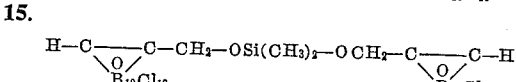

16. 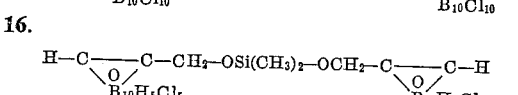

17. 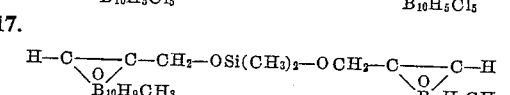

18. 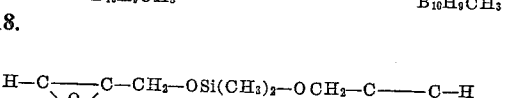

19. 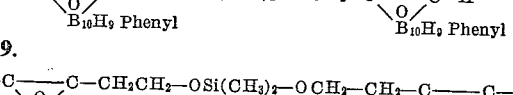

20. 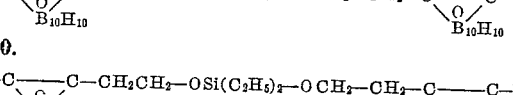

21. 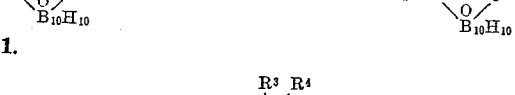

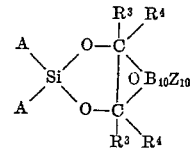

wherein R³ and R⁴ are selected from the group consisting of hydrogen and methyl, A is selected from the group consisting of alkyl, aryl and arylalkyl and Z is selected from the group consisting of hydrogen, halogen, alkyl and aryl.

22.

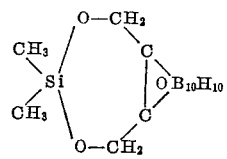

23. 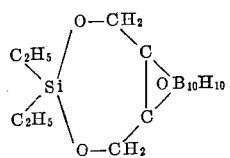
24. 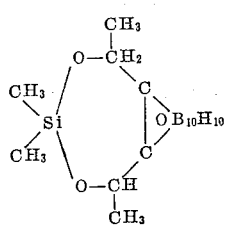
25. 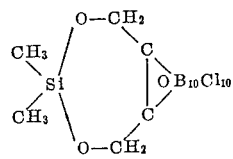
References Cited by the Examiner
UNITED STATES PATENTS
3,137,719  6/1964  Papetti _____ 260—448.2
TOBIAS E. LEVOW, *Primary Examiner.*
REUBEN EPSTEIN, CARL D. QUARFORTH,
*Examiners.*
L. A. SEBASTIAN, P. F. SHAVER,
*Assistant Examiners.*